INVENTORS
NOEL MEYER RUST
ERNEST F. GOODENOUGH
BY
ATTORNEY

June 3, 1941.   N. M. RUST ET AL   2,244,022
ELECTRICAL FILTER
Filed April 27, 1939   3 Sheets-Sheet 2

INVENTORS
NOEL MEYER RUST
ERNEST F. GOODENOUGH
BY
ATTORNEY

Fig. 12
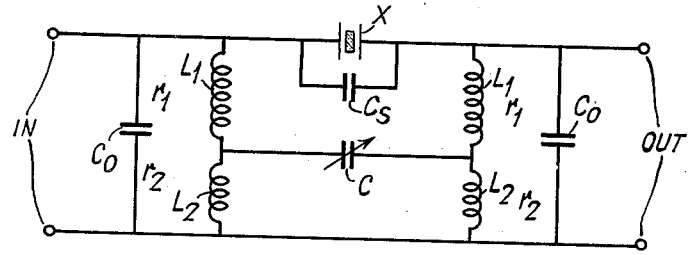
Fig. 13  Fig. 14  Fig. 15
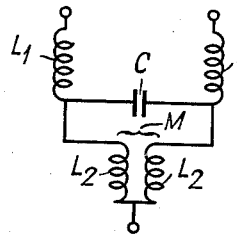 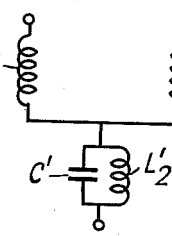 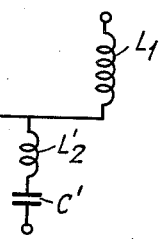
Fig. 16
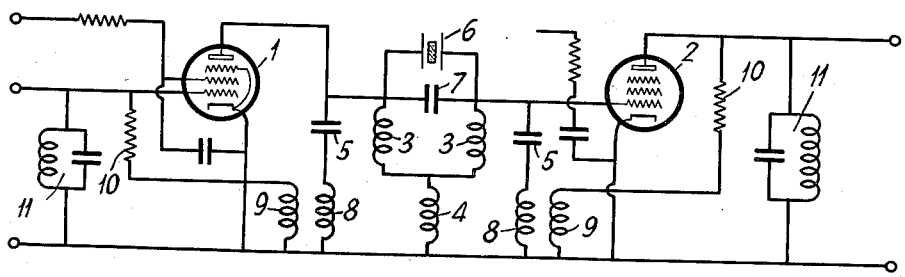
Fig. 17a  Fig. 17b
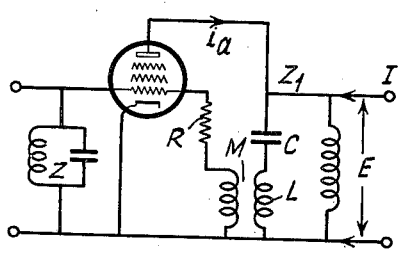 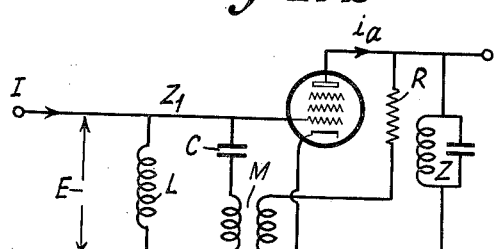
INVENTORS
NOEL MEYER RUST
ERNEST F. GOODENOUGH
BY
ATTORNEY Patented June 3, 1941

2,244,022

UNITED STATES PATENT OFFICE 2,244,022

ELECTRICAL FILTER

Noël Meyer Rust, Danbury Common, Chelmsford, and Ernest Frederick Goodenough, Springfield, Chelmsford, England, assignors to Radio Corporation of America, a corporation of Delaware Application April 27, 1939, Serial No. 270,318
In Great Britain April 28, 1938

3 Claims. (Cl. 178—44)

This invention relates to electrical filters and more particularly to so-called band pass filters. The main object of the invention is to provide an improved easily manufactured and adjusted band pass filter which shall have a response curve with a flat "top" and steep "sides," and in which the width of the "top" shall be capable of easy variation. Though not limited to its application thereto the invention is particularly suitable for use as a beat frequency, adjustable selectivity band pass filter in a superheterodyne radio or like receiver.

According to this invention a four-terminal band pass filter network comprises a pair of input terminals and a pair of output terminals, one terminal of one pair being common with one terminal of the other; input and output circuits connected respectively between the input and between the output terminals and said input circuit including a tuning condenser connected between the input terminals and in parallel with a main inductance in series with a further inductance and said output circuit similarly including a tuning condenser connected between the output terminals and in parallel with a main inductance in series with a further inductance, the two further inductances being mutually coupled; and a piezo electric crystal connected between a point on one main inductance and a corresponding point on the other.

Figure 9:
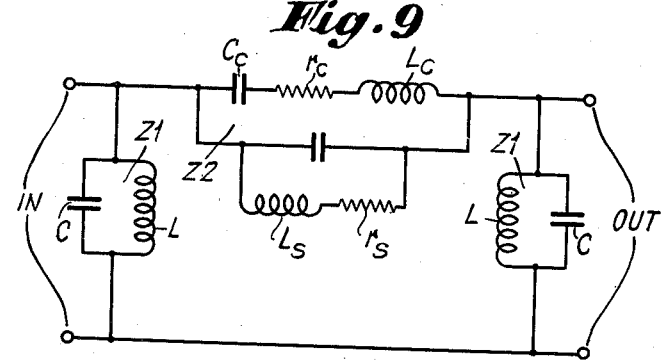
Figure 10:
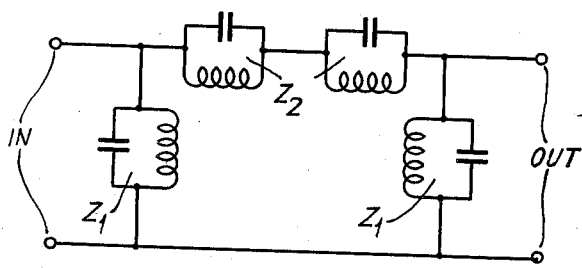
Figure 11:
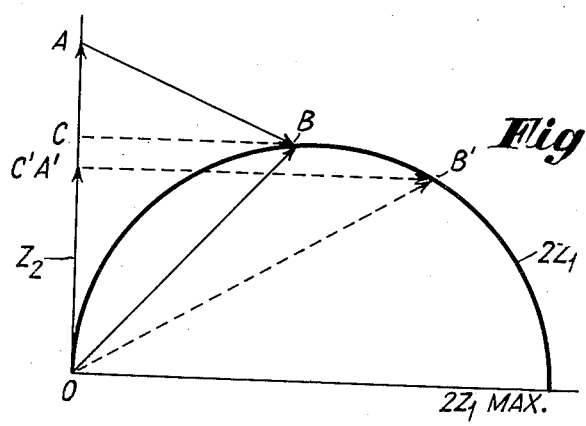

In the drawings, Figs. 1 to 4 are various modifications of electrical filter networks in accordance with the invention. Figs. 5 to 8 are response curves obtained with appropriate adjustments of the filter networks disclosed in Figs. 1 to 4. Fig. 9 is the electrical equivalent of the filter networks of Figs. 1 to 4. Fig. 10 is a further equivalent circuit of the filter networks. Fig. 11 is an explanatory vector diagram of the behaviour of the filter networks at frequencies close to the mid-frequency of the passed band. Fig. 12 is a further modification of a filter network in accordance with the invention. Figs. 13 to 15 are alternative forms of couplings that may be used in place of that shown in Fig. 12. Fig. 16 is a still further modified form of band pass filter in which reaction is employed, and Figs. 17a and 17b are circuits which serve to explain the operation of the circuit of Fig. 16.

Figure 1:
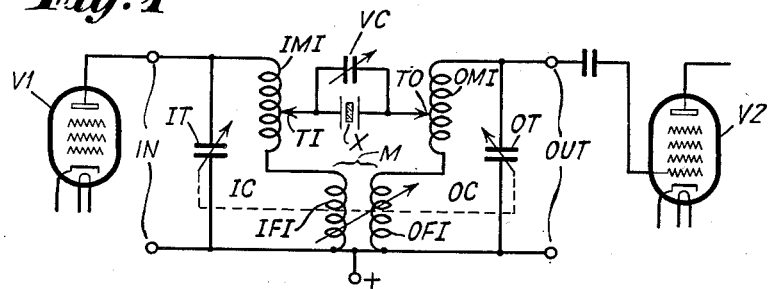

One embodiment of the invention is shown diagrammatically in the accompanying Figure 1 in which "in" and "out" are, respectively, the input and output terminals; IC and OC the input and output circuits; IT, IMI, and IFI the tuning condenser, main inductance and further inductance, respectively, in the input circuit; OT, OMI and OFI the tuning condenser, main inductance and further inductance, respectively, in the output circuit; X the piezo electric crystal connected between taps TI and TO; and the bracket M represents the coupling between IFI and OFI. In Figure 1 the crystal X is parallel with a variable condenser VC and the whole network couples the plate circuit of a valve V1 to the grid circuit of a valve V2.

Figure 2:
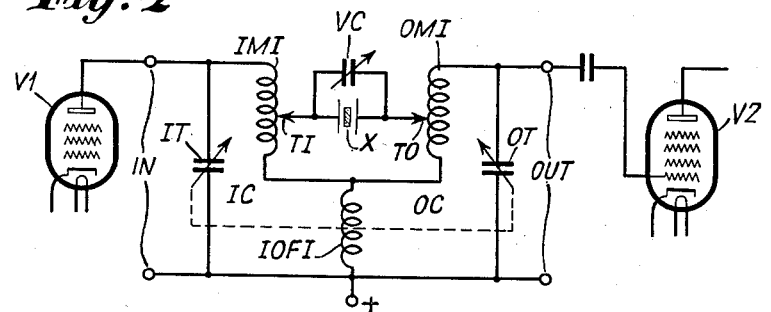
Figure 3:
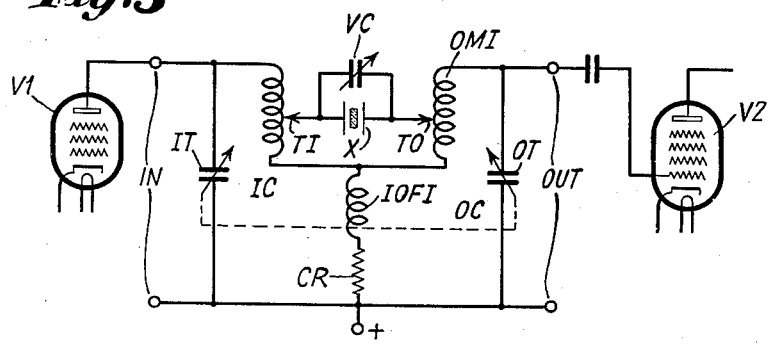
Figure 4:
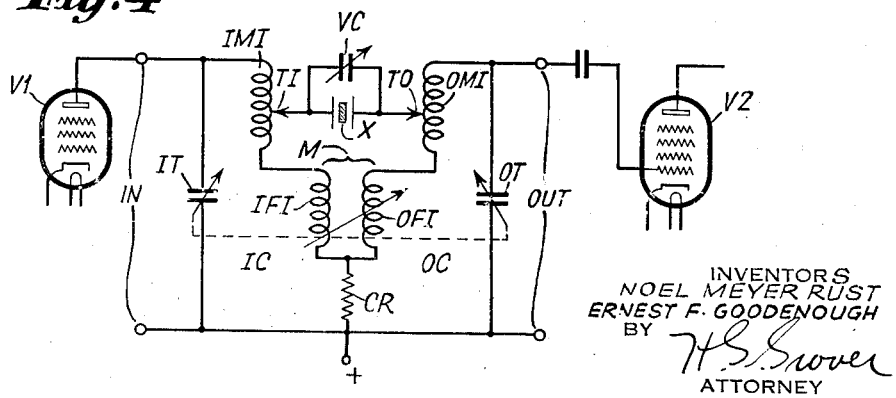

In a modified form of the invention illustrated in the accompanying Figure 2 the two mutually coupled further inductances IFI, OFI of Figure 1 are replaced by a single equivalent further inductance IOFI connected between the common terminal and the corresponding ends of the main inductances IMI, OMI. Further, if desired, and as shown in the accompanying Figure 3, there may be interposed in series with the single equivalent further inductance IOFI or (as shown in the accompanying Figure 4) between the junction point of the two mutually coupled further inductances IFI, OFI and the common terminal (as the case may be) a resistance CR of desired magnitude. The two points between which the piezo electric crystal is connected may be, as shown in Figures 1 to 4, intermediate tap points on the two main inductances IMI and OMI or they may be at those ends of said main inductances which correspond one with an input terminal and the other with an output terminal. It will be appreciated that in any event the crystal will be shunted by the capacity of its holder, but this capacity may, if desired, be supplemented by an actual condenser connected across the crystal. Condenser VC is such a condenser. Where two mutually coupled further inductances are employed as in Figures 1 and 4 the mutual inductance is preferably arranged to be variable as indicated. Again, where a condenser VC is connected across the crystal, this may be arranged to be variable as shown. In addition, provision may be made for varying the tuning of the two tuning condensers IT, OT, in such manner that the capacity of one condenser is increased and that of the other decreased approximately equally simultaneously (or vice versa), preferably by gang control (as indicated conventionally in Figures 1 to 4) of these condensers and/or by varying the positions of the taps TI, TO, between which the crystal is connected, again preferably, by gang control.

Figure 5:
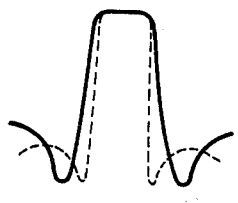
Figure 6:
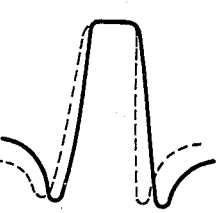

The effects obtainable by the various adjustments are as follows:

(1) Simultaneous variation of the mutual inductance M and of the capacity VC across the crystal, leaves the height and width of the "flat top" of the characteristic practically unchanged but varies the slope of the "sides." This is represented in conventional graphical form in the accompanying Figure 5.

(2) Variation of the mutual inductance M or variation of the capacity VC across the crystal, leaves the height and width of the "flat top" of the characteristic practically unchanged, but affects the frequency of the "dips" and steepness of the "sides," moving one "dip" closer to the "flat top" and the other further away therefrom, or vice versa, according to the adjustment. At the same time the "skirt rises" on either side of the "dips" become uneven, the greater "rise" corresponding to the "dip" which is closer to the mid-band frequency or "flat top." This is represented in the accompanying Figure 6.

Figure 7:
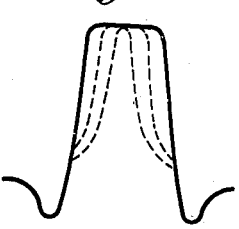
Figure 8:
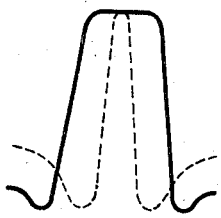

(3) Variation of the taps TI TO between which the crystal is connected, leaves the "dip" frequencies practically unaltered but controls selectivity by varying the slopes of the "sides" and controlling the width of the "top." This is represented in the accompanying Figure 7. Variation of the tap will also involve alteration of condenser VC or of the mutual inductance M.

(4) Variation of the tuning of the two tuning condensers IT, OT, produces a result similar to that produced by (3) above and represented in Figure 7.

(5) Simultaneous effecting of variations as set forth in (1) and (3) above, or as set forth in (1) and (4) above, leaves the slopes of the "sides" practically unaltered but controls the selectivity by controlling the width of the "top" and simultaneously moving the "dips" towards or away from one another. At the same time the "rises" outwardly of the "dips" are varied, the said "rises" becoming greater as the selectivity is increased. This is represented in the accompanying Figure 8.

The functioning of a filter in accordance with this invention may best be described by considering the equivalent electrical circuit of a filter as above described. This equivalent circuit is represented in the accompanying Figure 9 and comprises an impedance ZI constituted by a parallel circuit consisting of inductance L and parallel capacity C connected between the input terminals; a similarly constituted parallel circuit impedance ZI between the output terminals; a series-resonant circuit comprising capacity $C_c$ resistance $r_c$ and inductance $L_c$ all in series (this is the equivalent of the crystal) between one input terminal and one output terminal; a capacity $C_s$ connected across said series resonant circuit (this represents the crystal holder capacity plus any supplementary capacity); and an inductance $L_s$ in series with a resistance $r_s$ connected across the capacity $C_s$. The series connected elements $L_s$ and $r_s$ constitute the delta equivalent of the star network M, R, and $L_1$—M (for the case where mutual inductance M is employed between coupled further inductances, $L_1$ being the inductance of each main inductance IMI, OMI and R the resistance (CR) in series with the further inductances IFI, OFE), or the delta equivalent of the star network $L_3RL_2$ (for the case where a single equivalent further inductance IOFI is employed L/3 is that inductance, R the resistance (CR) in series therewith and $L_2$ the inductance of each main inductance IMI, OMI). In the one case (the mutual inductance case)

$$L_s = \frac{(L_1+M)(L_1-M)}{M}$$

and $$r_s = 2r_1\frac{L_1}{M} - R\left(\frac{L_1-M}{M}\right)^2$$

and in the other $$L_s = \frac{(L_2+2L_3)L_2}{L_2}$$

and $$r_s = 2r_1\frac{L_2+L}{L_3} - R\left(\frac{L_2}{L_3}\right)^2$$

In these formulae $r_1$ is the inherent resistance $L_1$ or $L_2$ as the case may be.

Also $L = L_2+2L_3$ or $L_1+M$
and $r = r_1+2R$

Thus the action of M or $M_3$ is in effect to place an inductance $L_s$ across the capacity $C_s$; this may be adjusted to resonate with $C_s$ at the same frequency as that at which the crystal resonates. Moreover by adjustment of the coupling resistance R, the resistance $r_s$ in series with $L_s$ may be made zero or negative, so that the circuit $C_s$ $L_s$ is in effect loss-less. This shunts the crystal which as stated above is equivalent to a series resonant circuit, but whose component values moreover are vastly different from anything obtainable by ordinary circuits. For instance, a crystal suitable for this type of filter and cut to oscillate at 450 kc. has equivalent component values $L_c=2.84$ henries, $C_c=.0433$ mmfd., $r_c=1,000$ ohms, and is thus a high Q circuit as well as of relatively high impedance.

Let the input and output circuits—hereinafter termed the "side" circuits—be designated simply $Z_1$ and the circuit between one input terminal and one output terminal $Z_2$ (see Figure 9). $Z_2$ may be regarded as represented in the accompanying Figure 10 as consisting of two parallel tuned low-loss circuits in series, one tuned a little above and the other a little below the mid-band frequency $f_0$, and presenting very high impedances at their resonance points at which, accordingly, the filter output will be very small, i. e. the "dips" in the response curve will occur at these resonant frequencies. In the neighborhood of $f_0$, however, $Z_2$ becomes, in effect, a series resonant circuit presenting only the resistance of the crystal, which is small compared to $Z_1$. It may be shown that the output of the filter is proportional to $$\frac{Z_1^2}{(2Z_1+Z_2)}$$

At a frequency slightly above $f_0$, $Z_1$ (tuned to $f_0$) becomes capacitative and $Z_2$ inductive, and these reactances tend to cancel. Owing to this fact the magnitude of $2Z_1+Z_2$ tends to decrease with frequency change at approximately the same rate as $Z_1^2$ with the result that as long as the above condition obtains, the output remains practically constant for a given current input. A decrease from $f_0$ in the frequency of the applied current causes $Z_1$ to become inductive and $Z_2$ capacitative with a similar result. As the "dip" frequency is approached, the response of course drops.

If the tuning of the input and output circuits $Z_1$ is changed, one being tuned to a frequency slightly above the mid band frequency $f_0$, and the other slightly below (i. e. their tuning is staggered), their added impedance is reduced and the controlling effect of the crystal is increased. Moreover, their added reactance at frequencies near $f_0$ is reduced to a still greater extent, so that it no longer cancels the crystal reactance. The combined effect is to sharpen the response curve to an extent depending on the amount of stagger.

The output of the filter at $f_0$ is not affected by staggering.

By tuning $L_s$ $C_s$ to a slightly different frequency, e. g. by varying M or $C_s$ the resonant frequencies of the series connected parallel tuned circuits regarded as comprised in $Z_2$ and therefore the positions of the "dips" may be altered asymmetrically with respect to $f_0$. One side of the response curve may be steepened considerably by this means.

A more rigorous examination of the circuit will now be made to find the relationships between the various component values, the separation of the "dip" frequencies and the width of the pass band.

Consider the case where the filter is used in an I. F. amplifier, for example, and is connected between the anode of a high impedance valve (screened grid or pentode) and the grid of another valve (see Figures 1 to 4). The anode impedance of the valve connected to the input may be assumed high compared with the input impedance of the filter so that the input current is practically constant over the frequency range considered for a constant voltage applied to the grid of that valve.

The voltage E at the output terminals of a three element filter such as $Z_1$, $Z_2$, $Z_1$, such as that of Figure 10, is given by $$E = iZ_1 \frac{Z_1}{Z_2 + 2Z_1}$$

Since the input current $i$ is constant in this case the output voltage is proportional to $$Z_1^2 / (Z_2 + 2Z_1)$$

To find the value of $Z_2$ in terms of the crystal constants and its shunt capacity $C_s$ first find its admittance by adding the admittance of the circuits comprising it. Since both are of high Q their resistances may be neglected at frequencies slightly removed from $f_0$.

The admittance of the parallel resonant circuit $L_s$ $C_s$ is $$Y_s = j\omega C_s + 1/j\omega L_s$$
$$= j\omega C_s (1 - 1/\omega^2 L_s C_s)$$
$$= j\omega C_s (1 - \omega_0^2/\omega^2)$$

where $$\omega_0^2 = 1/L_s C_s$$
$$= j\omega C_s \frac{\omega + \omega_0}{\omega} \cdot \frac{\omega - \omega_0}{\omega}$$

Put $$\omega = \omega_0 \pm d\omega$$

where $$d\omega << \omega_0$$

Then $$\frac{\omega + \omega_0}{\omega} \doteq 2$$

and $$\frac{\omega - \omega_0}{\omega} \doteq \pm \frac{d\omega}{\omega}$$

$$\therefore Y_s \doteq \pm j\omega C_s \cdot \frac{2d\omega}{\omega} \doteq \pm j2d\omega . C_s$$

Also the admittance of the crystal is $$Y_c = \frac{1}{j\omega L_c - \frac{j}{\omega C_c}} \doteq \frac{1}{j\omega L_c \left(1 - \frac{1}{\omega^2 L_c C_c}\right)}$$
$$= \frac{1}{\pm j2d\omega . L_c}$$

since $$\frac{1}{L_c C_c} = \omega_0^2$$

The total admittance is therefore $$Y_2 = \pm j2d\omega . C_s + \frac{1}{\pm j2d\omega . L_c}$$
$$= \frac{1 - (2d\omega)^2 . L_c C_s}{\pm j2d\omega . L_c}$$

$$\therefore Z_2 \frac{\pm j2d\omega . L_c}{1 - (2d\omega) 2 L_c C_s}$$

and is positive for an increase in frequency and negative for a decrease.

$Z_2$ is therefore greatest when $$(2d\omega)^2 L_c C_s = 1$$

i. e. when $$2d\omega = \frac{\pm 1}{\sqrt{L_c C_s}} = 2\pi f_{b2}$$

where $f_{b2}$ is the frequency separation of the "dips" and is incidentally the resonance frequency of $L_c$ and $C_s$.

The behaviour of the network at frequencies close to $f_0$ may be visualized by means of the vector diagrams of $Z_1$ and $Z_2$.

From the expression for $Z_2$ above, it is clear that its vector diagram will be as represented in the accompanying Figure 11 a straight line passing practically through the origin (since $r_c$ is small). The vectors move upwards from 0 for small positive values of $d\omega$ and downwards for negative values, their lengths increasing uniformly at first, and then increasing at a greater rate as $(2d\omega)^2 L_c C_s$ approaches unity. Eventually they change sign and decrease in length.

Half the vector diagram for $2Z_1$ will be a semicircle $OBB^1$ (see Figure 11) on a diameter at right angles to the above mentioned straight line vector diagram for $Z_2$. This diameter is drawn equivalent to the magnitude of $2Z_1$ at resonance to the same scale as that adopted for $Z_2$.

It is convenient to reverse one of the vectors (that for $Z_2$ say) and the sum $2Z_1 + Z_2$ will then be seen to be represented by the line AB joining the ends of the vectors OA and OB for $Z_2$ and $2Z_1$ for each particular frequency.

To obtain an expression for $Z_1$ in terms of $d\omega$ add $r + j\omega L$ and $$\frac{1}{j\omega C}$$

in parallel giving $$Z_1 = \frac{(r + j\omega L) \frac{1}{j\omega C}}{r + j\left(\omega L - \frac{1}{\omega C}\right)} \doteq \frac{\frac{L}{C}}{r + j\omega L\left(1 - \frac{1}{\omega^2 LC}\right)}$$

Put $1/LC = \omega_0^2$ and then $$Z_1 \doteq \frac{L/C}{r + j2d\omega . L}$$
$$= \frac{Z_{max}}{1 + j\frac{2d\omega . L}{r}}$$
$$= \frac{Z_{max}}{1 + jk} \text{ where } k = \frac{2d\omega . L}{r}$$
$$= Z_{max} \frac{1 - jk}{1 + k^2}$$

The magnitude of $Z_1$ is therefore $$\frac{Z_{1max}}{\sqrt{1+k^2}}$$

and its real part is $$\frac{Z_{1max}}{1+k^2}$$

Hence $$Z_1^2 = \frac{Z_{1max}^2}{1+k^2} = Z_{1max} \times \text{ (the real part of } Z_1\text{)}$$

Therefore $Z_1^2$ is proportional to the length of the line CB. Hence the output of the filter is proportional to the ratio of the length CB to the length AB. This ratio is equal to unity at $f_0$ corresponding to maximum output, and also at the frequency for which OA=OC as at A′ and B′. Between this frequency and $f_0$ the ratio CB/AB is slightly less than unity but at greater frequencies OA lengthens rapidly so that the said ratio decreases rapidly and a sharp cut off is obtained. At still greater frequencies the ratio increases again somewhat, giving a rising "skirt." The action is similar on both sides of $f_0$ giving a practically symmetrical pass band between cut-off frequencies outwardly of which are rising "skirts."

The frequencies at which CB=AB may be found by equating $Z_2$ and the reactive component of $2ZB_1$ thus:

$$\frac{2d\omega . L_c}{1-(2d\omega)^2 L_c C_s} = \frac{2Z_{max} k}{1+k^2} = \frac{2Z_{max}\frac{2d\omega . L}{r}}{1+\left(\frac{2d\omega L}{r}\right)^2}$$

Now $Z_{max} = \omega_0 L Q$, and $\omega_0 L/r = Q$
Hence substituting for $Z_{max} L/r$ and cancelling $2d\omega$, $$\frac{L_c}{1-(2d\omega)^2 L_c C_s} = \frac{2LQ^2}{1+\left(\frac{2d\omega}{\omega_0}\cdot Q\right)^2} = \frac{2L}{\frac{1}{Q^2}+\left(\frac{2d\omega}{\omega_0}\right)^2}$$

$$\therefore L_c\left(\frac{1}{Q^2}+\left(\frac{2d\omega}{\omega_0}\right)^2\right) = 2L(1-(2d\omega)^2 L_c C_s)$$

i. e. $\left(\frac{2d\omega}{\omega_0}\right)^2 (L_c + 2L.\omega_0^2 L_c C_s) = 2L - L_c/Q^2$ $$\therefore \left(\frac{2d\omega}{\omega_0}\right)^2 = \left(\frac{f_{b1}}{f_0}\right)^2 = \frac{\frac{2L}{L_c}-\frac{1}{Q^2}}{1+2\omega_0^2 L C_s}$$

where $f_{b1}$ = the peak separation or pass band width $L = L_1 + M$ or $L_2 + 2L_3$ (as the case may be).

Hence for a triple-peaked response curve to be obtained, $2L/L_c$ must be greater than $1/Q^2$. For normal values of L and Q, $L_c$ must therefore be kept relatively small, i. e. compared with the values of $L_c$ found in crystals of normal cuts. As an example let L=.001 of a henry, Q=50. Then $L_c < 2 \times .001 \times 50^2 < 5$ henries.

It will be found convenient to substitute for $C_s$ in terms of $f_{b2}$ the separation of the dips. Then $$\left(\frac{f_{b1}}{f_0}\right)^2 = \frac{\frac{2L}{L_c}-\frac{1}{Q^2}}{1+\frac{2L}{L_c}\left(\frac{f_0}{f_{b2}}\right)^2}$$

which, re-arranged, gives $$\frac{2L}{L_c} = \frac{\left(\frac{f_{b1}}{f_0}\right)^2 + \frac{1}{Q^2}}{1-\left(\frac{f_{b1}}{f_{b2}}\right)^2}$$

From these equations the values of $L_c$ and $C_s$ may be determined in terms of L, Q, $f_{b1}$, and $f_{b2}$.

The following is an example of practical figures employed in an experimentally tested filter in accordance with this invention:

$L_1 = 1,340$ micro-henries
$L_c = 3.08$ henries
$C_s = 10$ micro-microfarads
$Q = 50$
$f_0 = 500$ kilocycles.

In this filter there was a substantially flat "top" between ±kc. from $f_0$, the output falling to about −65 db. (taking the "top" as zero) at cut-off frequencies at about ±13 kc. from $f_0$, the "skirts" rising to about −40 db. at about ±25 kc. from $f_0$.

In the filters so far described, as positive mutual inductance or equivalent self-inductance is used to couple two tuned circuits which are also coupled by a crystal; the inductive coupling is intended to counteract coupling due to unavoidable shunt capacity across the crystal. As has been shown above, the small shunt mutual inductance is equivalent to a large inductance ($L_s$) shunting the crystal and which may be made to tune with the capacity ($C_s$) also shunting the crystal. A defect is that $L_s$ and $C_s$ must be tuned very accurately to the resonance frequency of the crystal, and this entails careful adjustment of either the mutual coupling or of $C_s$. Alteration of the mutual coupling, of course, alters the tuning of the side circuits so that the tuning condensers have to be readjusted and variation of $C_s$ is often impracticable because it has to be kept as small as possible and the provision of an extra capacity (such as is shown in the preceding figure) for tuning purposes may not be permissible. Again $C_s$ is at the high A. C. potential position in the filter and it may, therefore, be required to be heavily screened making adjustment physically impracticable. Further, variation of the mutual inductance involves unwieldy and relatively expensive apparatus.

In the embodiments now to be described these defects are avoided by using in place of a variable mutual inductance, a variable condenser in a relatively low potential part of the filter. As will be seen later in these arrangements the tuning of the side circuits is not affected by varying this condenser. Figure 12 shows a preferred filter of this nature. As will be seen the circuit of Figure 12 is very similar to that of Figure 1, the main difference being the omission of the mutual inductance M and the provision of the condenser C. In Figure 12 the references employed are those which are utilised in the following mathematical description. In Figure 12 it may be shown that the equivalent shunt inductance $L_3'$ is given by formula:

$$L_3' = L_2 \frac{\omega^2 L_2 C}{2\omega^2 L_2 C - 1}$$

the inductance being in series with an equivalent resistance $r'$ as given by the formula:

$$r' = 2r_2 \omega^2 L_2 C \frac{\omega^2 L_2 C - 1}{(2\omega^2 L_2 C - 1)^2}$$

It may also be shown that the equivalent side circuit inductance $L'$ of Figure 12 is given by the formula:

$$L' = L_1 + \frac{L_2}{1-2\omega^2 L_2 C} + \frac{2L_2.\omega^2 L_2 C}{2\omega^2 L_2 C - 1} = L_1 + L_2$$

from which it will be seen that $L'$ is independent of C. The inductance $L'_s$ in shunt with $C_s$ is given by $$L'_s = 2(L_1+L_2)\frac{L_1}{L_2}\left(1-\frac{1}{2\rho}\right)$$

this inductance being in series with an equivalent resistance $r'_s$ as given by the formula $$r'_s = 2\frac{L_1}{L_2}\left(1-\frac{1}{\rho}\right)\left[r_1\left(1\pm\frac{1+\frac{L_2}{L_1}}{1-\frac{1}{\rho}}\right)-\frac{L_1}{L_2}r_2\right]$$

The condition for resistance balance, i. e. for $r'_s$ to be equal to zero, is $$\frac{L_1}{L_2}\cdot\frac{r_2}{r_1}=\frac{Q_1}{Q_2}=1+\frac{1+\frac{L_2}{L_1}}{1-\frac{1}{\rho}}=\frac{2+\frac{L_2}{L_1}-\frac{1}{\rho}}{1-\frac{1}{\rho}}$$

where $$\rho = \omega^2 C \frac{L_1 L_2}{L_1 L_2}$$

Thus $\rho$ must lie between ½ and 1.

If the balancing condenser C is connected between tappings on continuous coils, the mutual inductance between the sections of the coils must be taken into account. Quantitatively this may be done by replacing C in the above equations by $$\frac{C}{1+\omega^2 MC}$$

replacing $L_1$ by $L_1+M_1$ and replacing $L_2$ by $L_2+M$ where M is the mutual inductance.

Figure 13 shows a further modification employing a combination of cross capacity coupling by condenser C and fixed mutual coupling as indicated by the bracket M. In this case the effective inductance in shunt with the crystal (not shown in Figure 13) consists of two inductances in parallel, one given by the inductances $L_1+L_2-M$ and M considered alone, and the other due to the inductance $L_1$, $L_2-M$, and the capacity C. The tuning of the side circuits is not affected in this case by adjustment of C. A fixed self-inductance may of course be used in place of M.

In Figures 14 and 15 are illustrated still further modifications (the crystal not being shown in either) wherein the effective inductance and the shunt coupling is varied by a shunt of series condenser C'. In Figure 14 the effective inductance $L_3'$ is given by $$L_3' = \frac{L_2'}{1-\omega^2 C'L'}$$

and in Figure 15 it is given by $$L_3' = L_2'\left(1-\frac{1}{\omega^2 C'L'}\right)$$

There will now described a still further modification of the invention which has the advantage of enabling a comparatively high impedance piezo electric crystal to be used in a band pass filter suitable for use in the intermediate frequency amplifier of a radio receiver where the ratio of the pass band to the carrier frequency is small or more particularly where the carrier frequency is high, e. g. above 1,500 kc.; of reducing "skirt" rise even if a low impedance crystal is used; and of enabling a high gain to be obtained.

Figure 16 shows two intermediate frequency valves 1 and 2 coupled by a filter comprising tuning coils 3, coil 4, tuning condensers 5, a piezo electric crystal 6 cut to resonate at the intermediate frequency, a small capacity 7 which may be the self-capacity of the crystal and which balances the coupling due to the coil 4 at the mid band. This filter is generally similar to the filter in Figure 1 but it may be noted that coils 8 are provided in series with the tuning condensers 5 these coils being coupled to coils 9 which are in series with resistance 10 one in the grid circuit of the valve 1 and the other in the anode circuit of the valve 2. 11 are the usual input and output circuits respectively. The resistances 10 may be variable. The coils 8 and 9 provide reaction or positive feed-back to the input and output circuits of the filter.

This filter will have an equivalent circuit similar to that shown in Figure 9 and it has already been shown in this case, that for a triple humped curve to be obtained $$\frac{2L}{L_c}$$

must be greater than $$\frac{1}{Q^2}$$

At high frequencies L and Q are not ordinarily very high so $L_c$ must be kept small. This is possible if the crystal is in the form of a plate vibrating in the thickness direction. Unfortunately, however, this type of crystal is very prone to spurious resonance in close proximity to the wanted resonance, and is therefore not very satisfactory for use since the desired sharp cut-off effects are not easily obtained. Even if a good crystal of sufficiently low impedance were obtained the response curve would not be good in the case of a high mid-band frequency because only a low value of Q is obtainable and outside the "dips" the response curve would rise again very badly since the said circuits would be incapable of providing the necessary attenuation. By applying, however, (in the manner shown or in any other convenient manner) suitable reaction to the side circuits, the value of Q is effectively raised and therefore a crystal of greater impedance may be used with coils of normal value without adversely affecting the pass band. The crystal may be of the type vibrating in the direction of its length and may be so proportioned that unwanted modes do not occur near the wanted mode, e. g. the crystal may be approximately square in the Y—Z plane in the case of an X-cut crystal. Further owing to the improved Q value "skirt" rise is considerably reduced and the effective impedance increased for the pass band thus giving better stage gain.

Any convenient known method of applying reaction may be used provided it does not seriously alter the tuning of the side circuits.

The detailed design of a filter as shown in Figure 16 will now be considered with the aid of Figures 17a and 17b. This will show the order of magnitude of the back coupling elements in order to obtain the required amount of reaction, and also the effect of those coupling circuits on the design of the filter. The use of reaction affects the reactance of the side circuits off tune, which also affects the pass band width of the filter.

The method adopted for determining the effective impedance of the side circuits Z is to find the voltage developed across Z when a given current I flows through it.

We may assume that the impedance of the back coupling coils is negligibly small compared with that of C and of R.

Considering first the side circuit connected to the anode of a valve (Figure 17a), when a current I flows in $Z_1$, a voltage will be induced in the grid circuit of the valve, so that an alternating anode current $i_a$ will also flow in $Z_1$. The voltage in the grid circuit will be due to the sum of these currents.

Thus the total current flowing through the condenser arm of $Z_0$ and hence through the primary of the back coupling coil is $$(I+i_a)\frac{r+j\omega L}{r+j\left(\omega L-\frac{1}{\omega C}\right)} \doteqdot j(I+i_a)\frac{Z_1}{\omega L}$$

since $$Z_1 = \frac{\omega^2 L^2}{r+j\left(\omega L-\frac{1}{\omega C}\right)}$$

The voltage induced in the coil in series with R is $$e = j(I+i_a)\frac{Z_1}{\omega L}\cdot j\omega M = -\frac{M}{L}Z_1(I+i_a)$$

of which a proportion, namely $$\frac{Z}{Z+R}$$

is applied to the grid of the valve.

This voltage, $$e_g = \frac{e_Z}{(Z+R)} = \frac{eZ^1}{R}$$

where $Z^1$ = the impedance constituted by $Z$ shunted by $R$, i. e.

$$e_g = -\frac{Z^1}{R}\cdot\frac{M}{L}\cdot Z_1(I+i_a)$$

but $$i_a = -ge_g \text{ or } e_g = \frac{-i_a}{g}$$

where $g$ = the mutual conductance of the valve $$\therefore I+i_a = Ig\frac{Z^1}{R}\cdot\frac{M}{L}\cdot Z_1(I+i_a)$$

$$= \frac{I}{1-gZ_1\frac{Z^1}{R}\frac{M}{L}}$$

Hence the voltage appearing across $Z_1$ due to the current $I$ is $$E = \frac{IZ_1}{1-gZ_1\frac{Z^1}{R}\frac{M}{L}}$$

and therefore the equivalent impedance of $Z_1$ is $$Z_E = \frac{E}{I} = \frac{Z_1}{1-gZ_1\frac{Z^1}{R}\frac{M}{L}}$$

The analysis of the case when $Z_1$ is in the grid circuit of a valve (Figure 17b) is similar, except that the total current flowing in $L$ must be considered to determine the voltage $E$ on the grid of the valve.

The current in $L$ due to $I$ is $$I\frac{\frac{1}{j\omega C}}{r+j\left(\omega L-\frac{1}{\omega C}\right)}$$

The voltage induced in series with $C$ due to $i_a$ is $$\frac{i_a Z}{(Z+R)}\cdot j\omega M = -gE\cdot j\omega M\cdot\frac{Z^1}{R}$$

The current in $L$ due to this voltage is $$\frac{gE\cdot j\omega M\cdot\frac{Z^1}{R}}{r+j\left(\omega L-\frac{1}{\omega C}\right)}$$

But $$E = j\omega LX \text{ the total current in } L$$

$$= \frac{I\frac{L}{C}}{r+j\left(\omega L-\frac{1}{\omega C}\right)} + \frac{gE\cdot\omega^2 ML\frac{Z^1}{R}}{r+j\left(\omega L-\frac{1}{\omega C}\right)}$$

$$= IZ_1 + EgZ_1\frac{M}{L}\cdot\frac{Z^1}{R}$$

$$= \frac{IZ_1}{1-gZ_1\frac{M}{L}\frac{Z^1}{R}}$$

$$\therefore Z_I = \frac{E}{I} = \frac{Z_1}{1-gZ_1\frac{M}{L}\frac{Z^1}{R}}$$

as above.

A similar result would have been obtained if, instead of the mutual back-coupling, one inductance common to $C$ and $R$ had been used, or alternatively, a capacity common to $L$ and $R$.

Obviously $Z_E$ may be made as large as desired at resonance by making the term $$gZ_1\frac{M}{L}\frac{Z^1}{R}$$

nearly equal to unity. Final adjustments are made by varying $g$, $R$ or $M$. In practice, it has been found most convenient to vary $R$.

The conditions for obtaining a given pass-band width are the same as those for the simple filter, namely that the reactance of the coupling impedance $Z_2$ must equal the sum of the reactances of the side circuits at the given frequency.

The reactance of $Z_E$ at any frequency $f$ off tune may be found from the expression $$\frac{1}{Z_E} = \frac{1}{Z_1} - g\frac{Z^1}{R}\frac{M}{L}$$

$$= \frac{1}{Z_1}(1+jk_1) - g\,Z^1\frac{M}{L}\frac{1-jk^1}{1+k^{12}}$$

where $Z_1$ and $Z'$ are the resonance values of $Z_1$ and $Z'$ respectively, and $k_1$ and $k^1$ are equal to $$Q\frac{2f}{f_0} \text{ and } Q'\frac{2f}{f_0}$$

respectively.

In practice, it is found that the pass band width $f_{b1}$ does not vary appreciably as the reaction is increased from a fairly low value to the highest value where oscillation sets in. It will simplify matters, therefore, to assume that the reaction is the maximum and $$g\frac{1}{Z}\frac{M}{L_0} = \frac{1}{Z_1}$$

$$\therefore \frac{1}{Z_E} = \frac{1}{Z_1}\left[1 - \frac{1}{1+k^{12}} + j\left(k_1 + \frac{k^1}{1+k^{12}}\right)\right]$$

$$= \frac{1}{Z_1}\frac{k^{12}+jk_1\left(1+k^{12}+\frac{k^1}{k_1}\right)}{1+k^{12}}$$

$$\therefore Z_E = Z_1(1+k^{12})\frac{k^{12}jk_1\left(1+k^{12}+\frac{Q'}{Q}\right)}{k^{14}+K^{12}\left(1+k^{12}+\frac{Q'}{Q}\right)^2}$$

Since Z is shunted by R, and we are considering frequencies relatively very close to the resonance frequency, we may neglect $k^{14}$ in the denominator of the expression for $Z_E$ without much error.

Then the reactive component of $Z_E$ is $$\frac{Z_1(1+k^{12})}{k_1\left(1+k^{12}+\frac{Q^1}{Q}\right)} = \frac{2\pi f_0 LQ(1+k^{12})}{Q\frac{2f}{f_0}\left(1+k^{12}+\frac{Q^1}{Q}\right)}$$

$$= \frac{2\pi f_0 L}{\frac{2f}{f_0}\left(1+\frac{Q^1}{Q}\cdot\frac{1}{1+k^{12}}\right)}$$

If the pass band width is to be $f_{b1}$ the reactance of $Z_2$ is $$\frac{2\pi f_{b1} L_C}{1-\left(\frac{f_{b1}}{f_{b2}}\right)^2}$$

and the following relation must be satisfied, $$\frac{2\pi f_{b1} L_C}{1-\left(\frac{f_{b1}}{f_{b2}}\right)^2} = 2 \times \frac{2\pi f_0 L}{\frac{f_{b1}}{f_0}\left(1+\frac{Q^1}{Q}\cdot\frac{1}{1+k^{12}}\right)}$$

or $$\frac{2L}{L_C} = \left(1+\frac{Q^1}{Q}\cdot\frac{1}{1+k^{12}}\right)\frac{\left(\frac{f_{b1}}{f_0}\right)^2}{1-\left(\frac{f_{b1}}{f_{b2}}\right)^2}$$

$$= \left(1+\frac{\frac{Q^1}{Q}}{1+Q^{12}\left(\frac{f_{b1}}{f_0}\right)^2}\right)\frac{\frac{f_{b1}}{f_0}}{1-\left(\frac{f_{b1}}{f_{b2}}\right)^2}$$

$$\doteq \left(1+\frac{Q^1}{Q}\right)\frac{\left(\frac{f_{b1}}{f_0}\right)^2}{1-\left(\frac{f_{b1}}{f_{b2}}\right)^2}$$

Thus $$\frac{2L}{L_c}$$

must be made larger than the value given by putting $Q=\infty$ in the expression for $$\frac{2L}{L_c}$$

found for the simple filter.

The reaction on the side circuits may be provided in other ways known per se, e. g. by coupling the tuning condensers in the grid and anode circuit of each valve by a common resistance. Again the effective impedance on the side circuits may be raised by shunting them by a negative resistance, such as a valve having a negative anode current-anode voltage characteristic.

A practical procedure for adjusting a filter as shown in Figure 16 is as follows:

(1) Set reaction control to give zero reaction.

(2) Tune the circuits 11 to the crystal resonance frequency (to obtain a good output from the amplifier at that frequency).

(3) Adjust the inductance 4 or capacity 7 so that the output becomes zero at frequencies approximately equidistant from the mid-band frequency.

(4) Tune capacities 5 to give maximum output at crystal frequency, tuning each alternately several times in succession.

(5) Tune circuits 11 accurately to the crystal frequency.

(6) Decrease resistance 19 (increase reaction) until the desired response curve is obtained.

What we claim is:

1. An adjustable band pass filter network adapted to be connected between the output of a first electron discharge tube and the input of a second, comprising a pair of circuits each tunable to a common frequency and including a tuning condenser and an inductance, mutual coupling means between said circuits, a piezo-electric crystal having a resonance frequency equal to that to which the circuits are tuned and a shunt capacity connected between the inductances of said circuits and providing additional coupling between said circuits, means coupling one of the filter circuits to the input of the first tube, and means coupling the other of said filter circuits to the output of the second tube.

2. An adjustable band pass filter network adapted to be connected between the output of a first electron discharge tube and the input of a second, comprising a pair of circuits each tunable to a common frequency and including a tuning condenser, a main inductance and an auxiliary inductance, mutual coupling means between said circuits, a piezo-electric crystal having a resonance frequency equal to that to which the circuits are tuned and a shunt capacity connected between the main inductances of said circuits and providing additional coupling between said circuits, means coupling one of the filter circuits to the input of the first tube, and means coupling the other of said filter circuits to the output of the second tube, said last mentioned coupling means each comprising an inductance coupled to one of the auxiliary inductances of the tunable circuits.

3. An adjustable band pass filter network adapted to be connected between the output of a first electron discharge tube and the input of a second, comprising a pair of circuits each tunable to a common frequency and including a tuning condenser and a series inductance, a main inductance and a common coupling reactance completing each of said tunable circuits, a piezo-electric crystal having a resonance frequency equal to that to which the circuits are tuned and a shunt capacity connected between the main inductances of said circuits, feed-back means between the input of the first tube and the tunable circuit connected to the output thereof including an inductance coupled to the series inductance of the latter circuit, and feedback means between the output of the second tube and the tunable circuit connected to the input thereof including an inductance coupled to the series inductance of the latter circuit.

NOËL MEYER RUST.
ERNEST FREDERICK GOODENOUGH.